May 30, 1939.  E. I. DUNN  2,160,473
ANIMAL SANITARY APPLIANCE
Filed Dec. 14, 1938
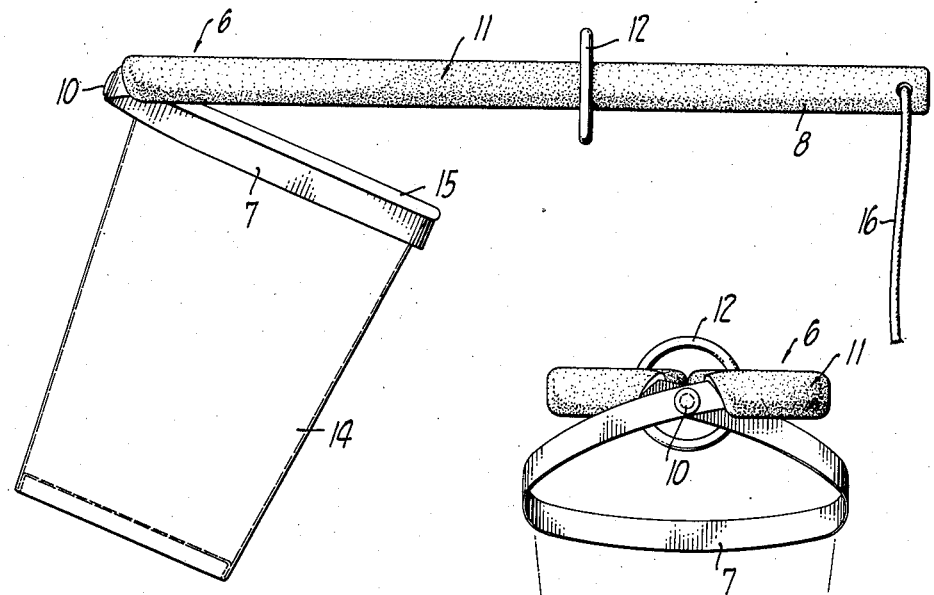
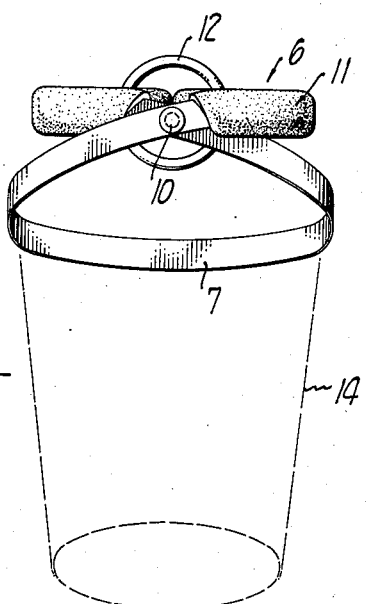
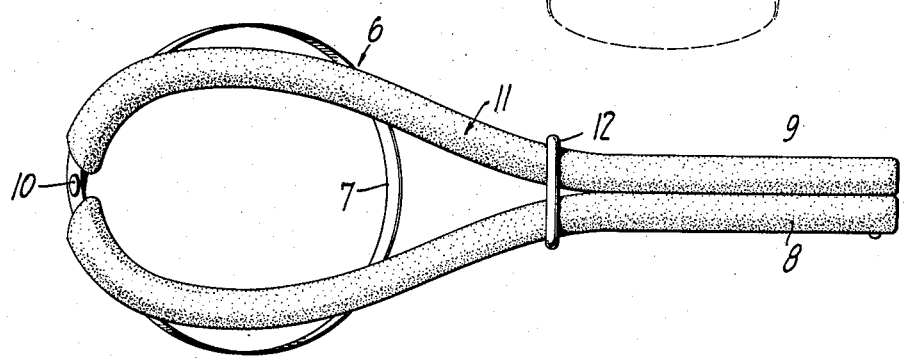
INVENTOR.
Edward I. Dunn
BY Robert H. Eckhoff
ATTORNEY Patented May 30, 1939

2,160,473

UNITED STATES PATENT OFFICE 2,160,473

ANIMAL SANITARY APPLIANCE

Edward I. Dunn, San Francisco, Calif.

Application December 14, 1938, Serial No. 245,597

2 Claims. (Cl. 119—95)

This invention relates to an article holder and, more particularly, to such a holder enabling an article such as a paper cup, to be positioned and held in position on an animal. For example, the present invention enables a receptacle to be positioned on an animal and held in position to the end that the animal does not commit a nuisance.

The present invention is particularly suited to use by animal lovers, particularly dog lovers who insist upon owning dogs in crowded centers of population. The application of such a device will be readily apparent to any resident in a large city where it is the common practice to walk the dogs about the city streets for exercise. For example, in New York city, the problem has become so aggravated that the police department has even actually installed signs along the sidewalk "Curb your dog."

It is in general the object of the present invention to provide a simple article receptacle holding means particularly suited for positioning and removal upon a dog.

Another object of the present invention is to provide a simple device which is readily installed for use, is easy to clean, and simple to manipulate.

The invention includes other objects and features of advantage, some of which, together with the foregoing, will appear hereinafter at length when the present preferred form of animal harness is disclosed.

In the drawing accompanying and forming a part hereof, Figure 1 is a side elevation of a preferred embodiment of the present invention in combination with a suitable receptacle.

Figure 2 is an end elevation, the dotted line portion thereof showing the receptacle in position.

Figure 3 is a plan view of the embodiment of the present invention shown herein.

As appears in the drawing, the device of the present invention is easily and readily manufactured from a length of flat spring material indicated generally at 6. This is looped upon itself to provide a receptacle receiving portion 7 and extending arms 8 and 9. A rivet 10 is placed at the end of the loop 7 to retain the receptacle receiving portion at the desired size.

The extending arms 8 and 9 are preferably rubber covered and a suitable rubber tubing indicated generally at 11 is conveniently slipped on the arms. A ring 12 is engaged over both arms and serves as a means to adjust the position of the saddle on the animal.

When the ring 12 is not in position, the arms 8 and 9 normally extend away from each other in opposite directions. In this position a suitable receptacle, such as the paper cup indicated generally at 14, is readily slipped into place in the loop 7 until the rim on the paper cup engages the loop 7. In this position the device is ready to be installed and accordingly the arms 8 and 9 are grasped and brought toward each other generally into that position in which they appear in Figure 3. The ring 12 is then slipped on and the harness is ready to be positioned. Normally the tail of the animal is slipped through the loop between the rivet 10 and the ring 12, the ring 12 being further slid along the arms 8 and 9 until the arms securely engage the dog's tail and retain the harness in place. In this position the paper cup is properly placed on the dog for nuisance avoidance. Since the structure is light in weight it is worn by the animal without any inconvenience and without attracting his attention to any particular extent.

When it is desired to remove the harness, the ring 12 is slipped along the arms 8 and 9 and the harness lifted up off the tail of the animal. By removing the ring 12 from the arms 8 and 9 and by separating the arms 8 and 9 and inverting the harness, the paper cup readily slips out and can be discharged into a garbage can or other waste receptacle.

If desired, flexible members such as a string or rubber band 16 can be secured to arm 8 so that the arms 8 and 9 can be held in position on the animal.

I claim:

1. In a device of the character described, an elongated spring strip member looped and secured upon itself to provide a receptacle receiving portion and arm portions extending therefrom, rubber tubing covering each of said arms, and a ring slidable along said arms to secure said arms together and in a cooperative clamping relationship.

2. In a device of the character described, an elongated spring strip member looped and secured upon itself to provide a receptacle receiving portion and arm portions extending therefrom, and a ring slidable along said arms to secure said arms together and in a cooperative clamping relationship.

EDWARD I. DUNN.